(12) United States Patent
Katsumata et al.

(10) Patent No.: US 12,417,578 B2
(45) Date of Patent: Sep. 16, 2025

(54) INFORMATION PROCESSING APPARATUS FOR ACQUIRING ACTUAL VIEWPOINT POSITION AND ORIENTATION AND VIRTUAL VIEWPOINT POSITION AND ORIENTATION OF USER, INFORMATION PROCESSING METHOD, AND STORAGE MEDIUM

(71) Applicant: CANON KABUSHIKI KAISHA, Tokyo (JP)

(72) Inventors: Takanori Katsumata, Tokyo (JP); Takabumi Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 18/160,220

(22) Filed: Jan. 26, 2023

(65) Prior Publication Data
US 2023/0245379 A1    Aug. 3, 2023

(30) Foreign Application Priority Data
Feb. 3, 2022    (JP) ................. 2022-015693

(51) Int. Cl.
*G06T 15/20*    (2011.01)
*G06T 7/70*    (2017.01)

(52) U.S. Cl.
CPC ............ *G06T 15/20* (2013.01); *G06T 7/70* (2017.01); *G06T 2207/30196* (2013.01)

(58) Field of Classification Search
CPC .. G06T 15/20; G06T 7/70; G06T 2207/30196
See application file for complete search history.

(56) References Cited

U.S. PATENT DOCUMENTS

2012/0086631 A1* 4/2012 Osman ................. A63F 13/525
                                                        345/156
2012/0321173 A1   12/2012 Mitarai

FOREIGN PATENT DOCUMENTS

JP    2006079174 A    3/2006
JP    2013545510 A    12/2013

\* cited by examiner

*Primary Examiner* — Xin Sheng
(74) *Attorney, Agent, or Firm* — Canon U.S.A., Inc. IP Division

(57) ABSTRACT

An information processing apparatus includes a first acquisition unit for acquiring an actual viewpoint position and orientation and a virtual viewpoint position and orientation of a first user, a second acquisition unit for acquiring an actual viewpoint position and orientation and a virtual viewpoint position and orientation of a second user, and a correction unit for correcting the virtual viewpoint position and orientation of the first user based on the virtual viewpoint position and orientation of the second user and a relative position and orientation between the actual viewpoint position and orientation of the first user and the actual viewpoint position and orientation of the second user.

18 Claims, 10 Drawing Sheets

INFORMATION PROCESSING APPARATUS FOR ACQUIRING ACTUAL VIEWPOINT POSITION AND ORIENTATION AND VIRTUAL VIEWPOINT POSITION AND ORIENTATION OF USER, INFORMATION PROCESSING METHOD, AND STORAGE MEDIUM

BACKGROUND OF THE DISCLOSURE

Field of the Disclosure

The present disclosure relates to an information processing technique for providing, for example, virtual reality, mixed reality, and augmented reality.

Description of the Related Art

Virtual reality, mixed reality, and augmented reality enable a user to observe various locations, such as buildings, represented by virtual three-dimensional (3D) models by moving only a virtual viewpoint to draw a virtual 3D model according to a user operation, without the user moving by itself. The function of moving the virtual viewpoint according to the user operation is referred to as a walk-through function. Virtual reality is often abbreviated as "VR". Mixed reality is often abbreviated as "MR". Augmented reality is often abbreviated as "AR".

To smoothly use the walk-through function, it is important to make clear the positional relationship between the user and the virtual 3D model to be observed and to easily recognize what the user is watching from where. For a plurality of users to observe a 3D model or the like and to communicate with each other, it is important for each user to recognize the positional relationship between the user and the other users without any confusion. Japanese Patent Application Laid-Open No. 2006-79174 discusses a technique having an actual-size observation mode in which an observer observes a virtual 3D space by being immersed in the virtual 3D space in an actual size, and a reduced-size observation mode in which the observer observes a virtual 3D space by reducing the size of a virtual 3D space computer graphics (CG) image. According to this technique, a CG map obtained by adding position and orientation information about the user is presented in the reduced-size observation mode.

SUMMARY OF THE DISCLOSURE

According to an aspect of the present disclosure, an information processing apparatus includes a first acquisition unit for acquiring an actual viewpoint position and orientation and a virtual viewpoint position and orientation of a first user, a second acquisition unit for acquiring an actual viewpoint position and orientation and a virtual viewpoint position and orientation of a second user, and a correction unit for correcting the virtual viewpoint position and orientation of the first user based on the virtual viewpoint position and orientation of the second user and a relative position and orientation between the actual viewpoint position and orientation of the first user and the actual viewpoint position and orientation of the second user.

Further features of the present disclosure will become apparent from the following description of exemplary embodiments with reference to the attached drawings.

BRIEF DESCRIPTION OF THE DRAWINGS

FIG. 2 illustrates a relationship between a virtual viewpoint and an actual viewpoint by walk-through.

DESCRIPTION OF THE EMBODIMENTS

Figure 1:
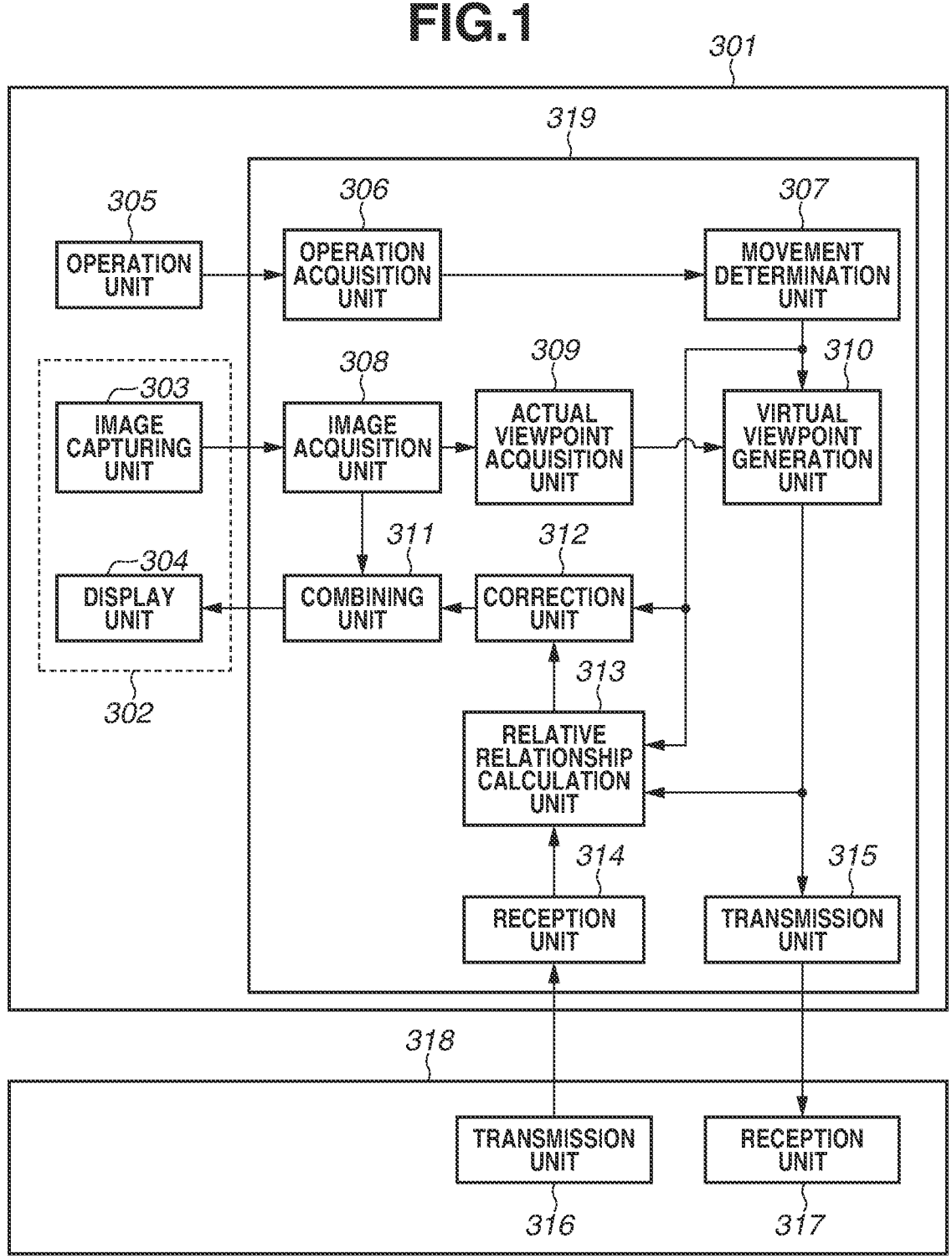
FIG. 1 is a block diagram illustrating a configuration example of an information processing apparatus according to a first exemplary embodiment.

Exemplary embodiments of the present disclosure will be described below with reference to the drawings. The following exemplary embodiments are not intended to limit the present disclosure. Not all of the combinations of the features described in the exemplary embodiments are indispensable for the solution to the issues of the present disclosure. The components of the exemplary embodiments can be appropriately modified or changed depending on the specifications of the apparatus to which the present disclosure is applied and various conditions (e.g., usage conditions, and usage environment). Some of the exemplary embodiments to be described below may be combined as appropriate. In the following exemplary embodiments, the same components are denoted by the same reference numerals.

FIG. 1 is a block diagram illustrating a configuration example of a system including an information processing apparatus 319 according to a first exemplary embodiment. The system according to the present exemplary embodiment is a system capable of providing a user with, for example, virtual reality (VR), mixed reality (MR), and augmented reality (AR). The present exemplary embodiment illustrates an example of providing MR to the user. The system according to the present exemplary embodiment also provides a walk-through function that enables the user to observe various locations, such as buildings, represented by virtual three-dimensional (3D) models by moving a virtual viewpoint to draw a virtual 3D model according to a user operation, without the need for the user to move by the user itself.

Before the description of the configuration and operation of the system according to the present exemplary embodiment, a positional relationship between a viewpoint position of each user and a 3D model or the like in a MR space in a case where a plurality of users is observing the 3D model and a certain user uses the walk-through function will be described with reference to FIGS. 2 and 3.

Figure 2:
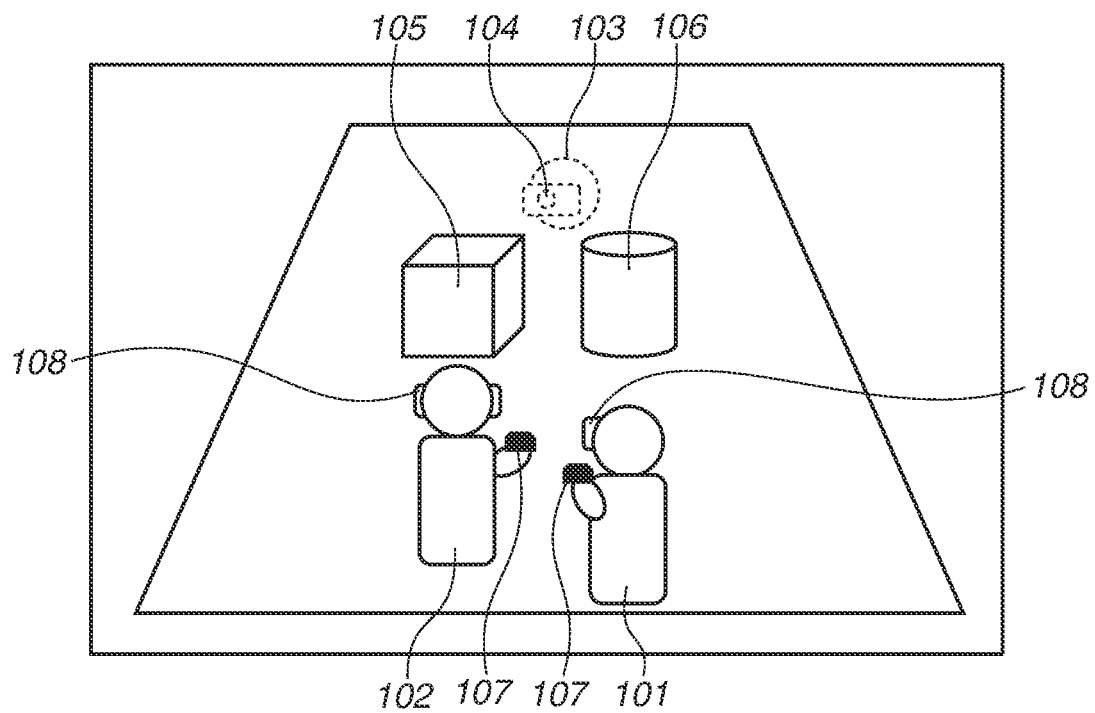

FIG. 2 schematically illustrates the layout of positions of the plurality of users and the 3D model, and the like in the mixed reality space, and the virtual viewpoint position and the like of a specific user in a case where the specific user executes walk-through in the mixed reality space. In this example, assume that there are two users.

In the example illustrated in FIG. 2, a virtual model 105 and a virtual model 106 are 3D models (3D objects) located in the mixed reality space. A user 101 and a user 102 exist as entities in an actual space. The user 101 and the user 102 are respectively wearing terminal head-mounted displays (hereinafter referred to as HMDs 108). Assume that the user 101 and the user 102 are observing the mixed reality space in which the virtual model 105 and the virtual model 106 are located through the HMDs 108 that are respectively worn by the user 101 and the user 102. Also, assume that the user 101 and the user 102 respectively have operation devices 107 to input various instructions in their hands. Also, assume that each of the user 101 and the user 102 can issue an instruction to, for example, move the virtual viewpoint in the mixed reality space through an operation input to the operation device 107. In the present exemplary embodiment, examples of the instruction input through the operation device 107 include an instruction to execute walk-through and move the virtual viewpoint, and an instruction to input a predetermined trigger operation to be described below.

In this example, assume that the user 102 executes walk-through to move the virtual viewpoint of the user 102 to the position and orientation indicated at a virtual viewpoint 104 illustrated in FIG. 2. In other words, the virtual viewpoint 104 of the user 102 is moved to an intermediate position between the virtual model 105 and the virtual model 106 on the opposite side of the virtual model 105 and the virtual model 106, and the virtual viewpoint 104 observes the virtual model 105 and the virtual model 106 from the back side thereof. In this case, an avatar 103 representing the user 102 in the position and orientation of the virtual viewpoint 104 is also located (displayed) in the mixed reality space. In this example, the virtual viewpoint 104 of the user 102 indicates the position and orientation in which the user 102 faces the front side and is located on the back side at the intermediate position between the virtual model 105 and the virtual model 106 by walk-through. Thus, the avatar 103 of the user 102 faces the front side.

Figure 3:
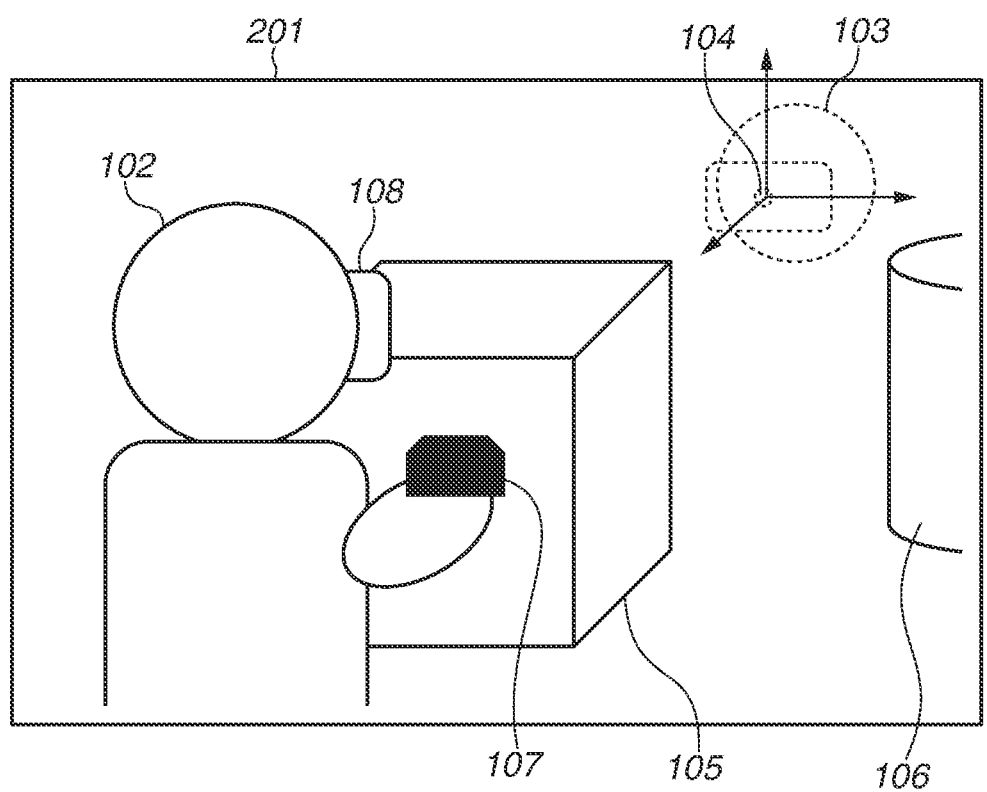
FIG. 3 illustrates an example of a mixed reality image viewed from a viewpoint of a user.

FIG. 3 schematically illustrates the mixed reality space observed from the viewpoint of the user 101.

The positional relationship with the user 102 in the MR space and the layout relationship between the virtual models 105 and 106 correspond to those of the example illustrated in FIG. 2. Specifically, in this example, the entity of the user 102 and the actual viewpoint (actual viewpoint of the head) of the user 102 are present on the front left side of the user 101, and the virtual viewpoint 104 of the user 102 is located at the intermediate position between the virtual models 105 and 106 on the opposite side of the virtual models 105 and 106. Accordingly, the user 101 can see the entity of the user 102 and the virtual model 105 on the left side, a part of the virtual model 106 on the right back side, and the avatar 103 on the back side at the intermediate position between the virtual model 105 and the virtual model 106 along with the walk-through of the user 102.

In the example illustrated in FIGS. 2 and 3, the way the user 101 can see the mixed reality space is different from the way the user 102 can see the mixed reality space. Specifically, the user 101 can see the mixed reality space as illustrated in FIG. 3, while the mixed reality image viewed from the virtual viewpoint 104 is displayed on the HMD 108 of the user 102. Accordingly, the way the user 102 can see the virtual model 105 and the virtual model 106 greatly differs from the way the user 101 can see the virtual model 105 and the virtual model 106. This makes it difficult for the user 101 to accurately recognize the situation seen by the user 102. Specifically, in a case where a plurality of users is observing the mixed reality space and a specific user executes walk-through, it is difficult for the other users to accurately recognize the relationship between the virtual viewpoint of each of the other users, and the virtual viewpoint and the actual viewpoint of the specific user during the walk-through. As a result, the users are more likely to be confused in communication.

Therefore, the information processing apparatus 319 according to the present exemplary embodiment is configured to perform processing for correcting a mismatch between the virtual viewpoint of a specific user by walk-through and the virtual viewpoint of each of the other users. The information processing apparatus 319 according to the present exemplary embodiment corrects the virtual viewpoint position and orientation of the other users in order to match the virtual viewpoint position and orientation of the specific user that has moved by walk-through.

If a plurality of users observes the MR space, the system according to the present exemplary embodiment illustrated in FIG. 1 uses an apparatus including the information processing apparatus 319, an operation unit 305, and a terminal 302 for each user. An apparatus 301 and an apparatus 318 illustrated in FIG. 1 have the same configuration and include similar processing functions. The apparatus 301 and the apparatus 318 each include the information processing apparatus 319, the operation unit 305, and the terminal 302. In the present exemplary embodiment, assume that a first user in the plurality of users (all provided with mixed reality) observing the mixed reality space uses the apparatus 301, and a second user that is different from the first user of the apparatus 301 uses the apparatus 318. In the system according to the present exemplary embodiment, the apparatus 301 and the apparatus 318 operate in cooperation through a transmission unit 315 and a reception unit 314, which are mounted in the apparatus 301, and a transmission unit 316 and a reception unit 317, which are mounted in the apparatus 318, thereby enabling the users to observe 3D images and the like in the mixed reality space. FIG. 1 illustrates a configuration example in which there are two users and two apparatuses, which are the apparatus 301 and the apparatus 318, operate in cooperation. However, if there are three or more users, three or more apparatuses operate in cooperation, thereby making it possible to provide the mixed reality to the three or more users. If there is a need to distinguish the user of the apparatus 301 from the user of the apparatus 318, particularly, in the configuration example of the apparatus 301 to be described below, the first user of the apparatus 301 is referred to as the "user" and the second user of the apparatus 318 is referred to as the "other user".

The terminal 302 includes an image capturing unit 303 that captures an image of an actual space (actual environment) near each user, and a display unit 304 that presents mixed reality images to each user. In the present exemplary embodiment, the HMD having a configuration in which the image capturing unit 303 and the display unit 304 are mounted in a head-mounted housing is used as the terminal 302. However, any other type of terminal, such as a tablet terminal or a smartphone terminal, can also be used. The HMD that is described by way of example in the present exemplary embodiment is a video see-through HMD that displays a virtual 3D model superimposed on an actual image captured by the image capturing unit 303, but instead a so-called optical see-through HMD can be used. The image capturing unit 303 includes a camera for capturing a moving image to be presented to each user, and a camera for acquiring images to be used to estimate the position and orientation of the terminal 302. Alternatively, the image capturing unit 303 may include one camera having both the function for capturing a moving image to be presented to each user and the function for acquiring images to be used to estimate the position and orientation. Depending on the method of acquiring the position and orientation and the method of displaying a 3D image superimposed on an actual image, one or both of the camera for capturing a moving image to be presented to each user and the camera for acquiring images to be used to estimate the position and orientation can be omitted. In the present exemplary embodiment, images to be presented to each user can be stereoscopic. Accordingly, in the terminal 302 according to the present exemplary embodiment, the camera for capturing images to be presented to each user and a display device to present mixed reality images are individually mounted for each of the left and right eyes of the user to realize the stereoscopic display. However, the configuration for realizing the stereoscopic display may be changed, as needed, depending on the configuration of the terminal 302, the method of acquiring the position and orientation of the terminal 302, or the method of displaying a virtual 3D image superimposed on an actual image. Image information about the actual space (actual environment) captured by the image capturing unit 303 is sent to the information processing apparatus 319. A mixed reality space image to be displayed on the display unit 304 is generated by the information processing apparatus 319 and is input to the display unit 304.

The operation unit 305 is an operation device to be when the user inputs various instructions.

The input to the operation unit 305 is implemented by, for example, one or more of a button input from a controller device or the like, a gesture input, and an audio input. The operation unit 305 may be mounted on the terminal 302, or may be configured as a separate device. While the user can input various instructions through the operation unit 305, the present exemplary embodiment illustrates an example where an operation for instructing to move the virtual viewpoint of the user is input. In the present exemplary embodiment, the input of the operation for instructing to move the virtual viewpoint of the user includes an input of an operation for moving the virtual viewpoint of the user by using the walk-through function of the apparatus 301, and an input of a predetermined trigger operation for instructing to move the virtual viewpoint of the user depending on the virtual viewpoint of the other user. Assume that the predetermined trigger operation is input to issue an instruction to move the virtual viewpoint of the user in the apparatus 301 to match the virtual viewpoint of the other user by walk-through executed by the apparatus 318 of the other user. In other words, the trigger operation to move the virtual viewpoint of the user to match the virtual viewpoint of the other user is an operation used as a trigger to execute processing for correcting a mismatch between the virtual viewpoint of the other user by walk-through and the virtual viewpoint of the user. In the present exemplary embodiment, the trigger operation is a trigger to move the virtual viewpoint of the user to match the virtual viewpoint of the other user by walk-through, and is thus hereinafter referred to as a "movement trigger".

The information processing apparatus 319 includes not only the function for estimating the position and orientation of the terminal 302 and the function for generating the mixed reality space image, but also a function for sharing the actual viewpoint position and orientation and the virtual viewpoint position and orientation between the apparatus 301 of the user and the apparatus 318 of the other user as described below. The information processing apparatus 319 includes an operation acquisition unit 306, a movement determination unit 307, an image acquisition unit 308, an actual viewpoint acquisition unit 309, a virtual viewpoint generation unit 310, a combining unit 311, a correction unit 312, a relative relationship calculation unit 313, the reception unit 314, and the transmission unit 315. FIG. 1 illustrates only the functional units that are mainly associated with information processing according to the present exemplary embodiment in all the components that are typically included in the information processing apparatus 319 that provides the mixed reality to each user, and the illustration of components other than the functional units is omitted.

The image acquisition unit 308 acquires an actual environment captured image captured by the image capturing unit 303 of the terminal 302.

The actual viewpoint acquisition unit 309 receives the actual environment captured image from the image acquisition unit 308, and calculates the actual viewpoint position and orientation of the user, who is wearing the terminal 302, based on the captured image. The actual viewpoint acquisition unit 309 sends information about the calculated actual viewpoint position and orientation of the user to the virtual viewpoint generation unit 310.

If a user operation is performed on the operation unit 305, the operation acquisition unit 306 acquires operation information corresponding to the user operation. In the present exemplary embodiment, the operation acquisition unit 306 includes a function for acquiring, as operation information, an input of an operation to, for example, move the virtual viewpoint position and orientation, from the user through the operation unit 305. Examples of the operation for instructing to move the virtual viewpoint position and orientation include an operation for instructing to move the virtual viewpoint of the user by walk-through, and an operation instruction using the movement trigger to move the virtual viewpoint of the user to match the virtual viewpoint of the other user by walk-through. The operation information acquired by the operation acquisition unit 306 is sent to the movement determination unit 307. The operation information is also sent to the virtual viewpoint generation unit 310, the correction unit 312, and the relative relationship calculation unit 313 through the movement determination unit 307.

The movement determination unit 307 determines whether the operation information acquired by the operation acquisition unit 306 is information indicating the operation for instructing to move the virtual viewpoint of the user. In the present exemplary embodiment, the movement determination unit 307 determines whether the operation information is information indicating an operation to move the virtual viewpoint of the user by walk-through or the like in the apparatus 301, or information indicating an operation of the movement trigger to move the virtual viewpoint of the user to match the virtual viewpoint of the other user by walk-through. In other words, the movement determination unit 307 functions as a trigger detection unit to detect the movement trigger, and upon detecting the movement trigger, outputs the operation information in which a flag indicating that the movement trigger is input is ON. The flag indicating that the movement trigger is input is hereinafter referred to as a "movement flag". The operation information obtained after the movement determination processing performed by the movement determination unit 307 is sent to the virtual viewpoint generation unit 310, the correction unit 312, and the relative relationship calculation unit 313.

The virtual viewpoint generation unit 310 receives the actual viewpoint position and orientation information from the actual viewpoint acquisition unit 309, and receives the operation information through the movement determination unit 307. The virtual viewpoint generation unit 310 generates the virtual viewpoint position and orientation of the user based on the actual viewpoint position and orientation information and the operation information corresponding to the viewpoint position input by the user. If walk-through or the like is executed in the apparatus 301 to move the virtual viewpoint of the user, the virtual viewpoint position and orientation generated by the virtual viewpoint generation unit 310 corresponds to the virtual viewpoint position and orientation of the user by walk-through or the like. The virtual viewpoint generation unit 310 sends the generated virtual viewpoint position and orientation information about the user and the actual viewpoint position and orientation information about the user received from the actual viewpoint acquisition unit 309, to the transmission unit 315. The virtual viewpoint position and orientation information and the actual viewpoint position and orientation information about the user are also sent to the relative relationship calculation unit 313.

The transmission unit 315 transmits the virtual viewpoint position and orientation information and the actual viewpoint position and orientation information received from the virtual viewpoint generation unit 310, to the reception unit 317 of the apparatus 318 having the same configuration as the apparatus 301.

The reception unit 314 receives the actual viewpoint position and orientation information and the virtual viewpoint position and orientation information about the other user. The actual viewpoint position and orientation information and the virtual viewpoint position and orientation information about the other user are acquired and generated in the same manner as described above in the apparatus 318 having the same configuration as the apparatus 301 and are transmitted from the transmission unit 316. The actual viewpoint position and orientation information and the virtual viewpoint position and orientation information about the other user received by the reception unit 314 are sent to the relative relationship calculation unit 313.

Thus, the actual viewpoint position and orientation and the virtual viewpoint position and orientation of the both users are shared between the apparatus 301 and the apparatus 318.

If the movement flag in the operation information is ON, the relative relationship calculation unit 313 calculates a relative relationship between the actual viewpoint position and orientation of the user and the actual viewpoint position and orientation of the other user, based on the actual viewpoint position and orientation information about the user and the actual viewpoint position and orientation information about the other user received from the reception unit 314. In the present exemplary embodiment, the relative relationship between the actual viewpoint position and orientation of the user and the actual viewpoint position and orientation of the other user is referred to as "actual viewpoint relative position and orientation". The relative relationship calculation unit 313 sends, to the correction unit 312, information about the calculated actual viewpoint relative position and orientation information, the virtual viewpoint position and orientation information about the other user, and the virtual viewpoint position and orientation information about the user. While the present exemplary embodiment illustrates an example where the relative relationship calculation unit 313 calculates the actual viewpoint relative position and orientation when the movement flag is ON, the relative relationship calculation unit 313 may constantly calculate the actual viewpoint relative position and orientation, regardless of whether the movement flag is ON or OFF.

If the movement flag in the operation information is ON, the correction unit 312 executes processing for correcting a mismatch between the virtual viewpoint of the other user and the virtual viewpoint of the user based on the actual viewpoint relative position and orientation received from the relative relationship calculation unit 313 and the virtual viewpoint position and orientation of the other user. The present exemplary embodiment assumes that processing for correcting a mismatch between the virtual viewpoint of the other user by walk-through and the virtual viewpoint of the user is performed. As described in detail below, the correction unit 312 adds the actual viewpoint relative position and orientation between the user and the other user to the virtual viewpoint position and orientation of the other user, thereby correcting the virtual viewpoint position and orientation of the user in order to match the virtual viewpoint of the other user by walk-through. The correction unit 312 sends the virtual viewpoint position and orientation information about the user obtained after the correction processing, to the combining unit 311. If the movement flag is OFF, the correction unit 312 does not perform the above-described correction processing, and the virtual viewpoint position and orientation information about the user generated by the virtual viewpoint generation unit 310 is sent to the combining unit 311 from the relative relationship calculation unit 313 through the correction unit 312.

The combining unit 311 generates a 3D image based on the received virtual viewpoint position and orientation, and combines the generated 3D image with the actual environment captured image acquired by the image acquisition unit 308 by superimposing the 3D image on the actual environment image, thereby generating a mixed reality image as a combination of the virtual image and the actual environment image. In this case, if the movement flag is ON, the mixed reality image generated by the combining unit 311 corresponds to the image that can be seen in the virtual viewpoint position and orientation of the other user by walk-through. In contrast, if walk-through or the like is executed in the apparatus 301 of the user and the movement flag is OFF, the mixed reality image generated by the combining unit 311 corresponds to the image that can be seen in the virtual viewpoint position and orientation along with the walk-through or the like of the user.

Figure 4:
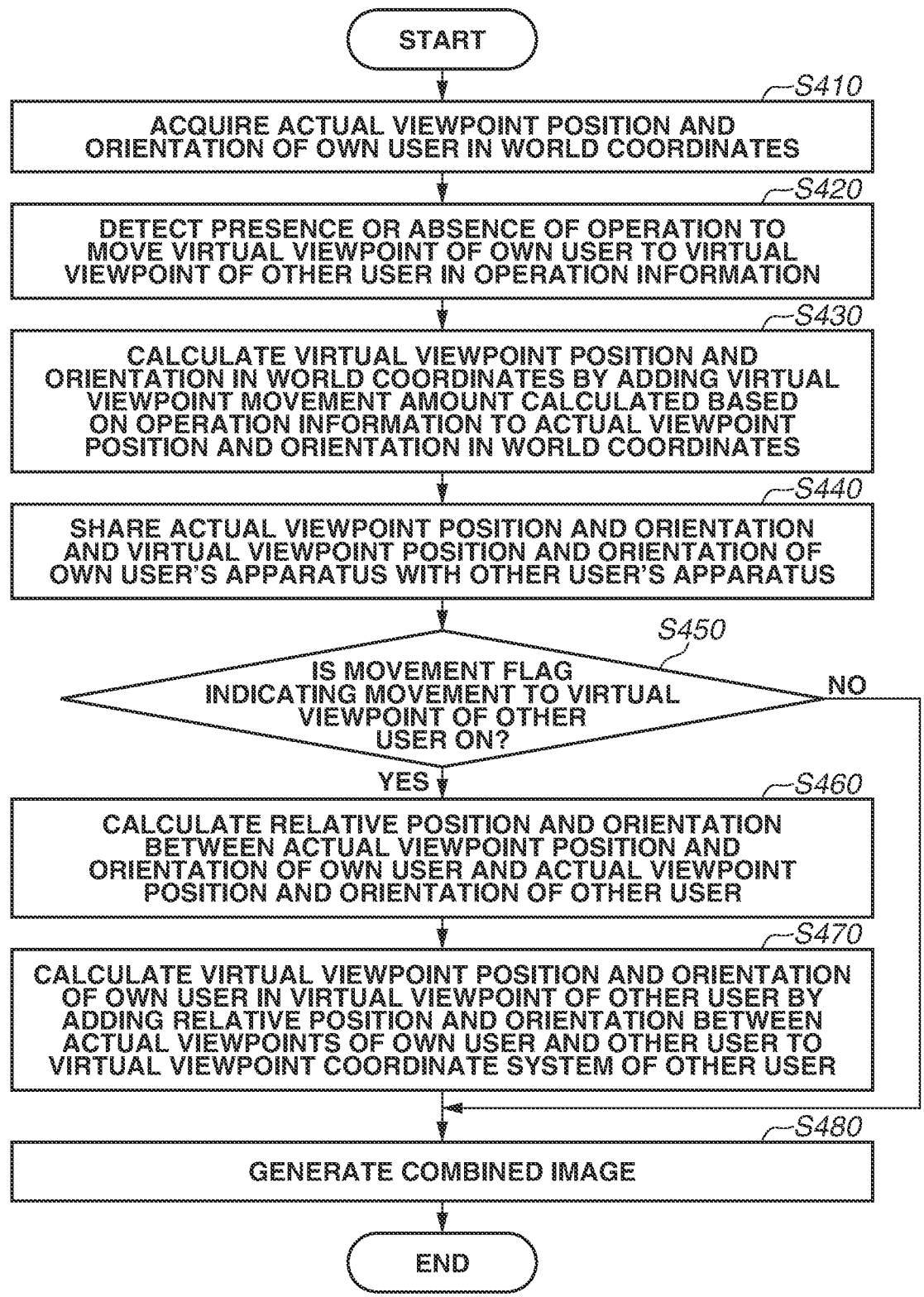
FIG. 4 is a flowchart illustrating an information processing flow according to the first exemplary embodiment.

FIG. 4 is a flowchart illustrating an information processing flow in which the actual viewpoint position and orientation and the virtual viewpoint position and orientation of the both users are shared between the information processing apparatus 319 of the apparatus 301 and the apparatus 318 of the other user as described above, and in which the mixed reality image is generated depending on whether the movement trigger is detected. While FIG. 4 illustrates only the processing performed in the information processing apparatus 319 of the apparatus 301, the same information processing is also performed in an information processing apparatus of the apparatus 318.

In step S410, the actual viewpoint acquisition unit 309 acquires the actual viewpoint position and orientation of the user in world coordinates of the actual space. As a method for acquiring the actual viewpoint position and orientation, for example, a method can be used of capturing an image of a marker located in the actual space and estimating the actual viewpoint position and orientation based on the layout of feature points of the marker in the captured image. For example, simultaneous localization and mapping (SLAM) can also be used of simultaneously performing self-position estimation and creation of an environmental map using natural feature points in an actual image obtained by capturing an image of the actual space. Alternatively, an external measurement apparatus, such as a motion capturing apparatus, may be used to acquire the actual viewpoint position and orientation. The origin and orientation of the world coordinate system representing the actual space are assumed to determine in advance using a marker or a specific real object. In the case of using any one of the above-described methods for acquiring the actual viewpoint position and orientation, if the apparatus 301 and the apparatus 318 use different methods, an error may occur in the acquisition result. It may thus be desirable for the apparatus 301 and the apparatus 318 to use the same method.

In step S420, the movement determination unit 307 determines whether the movement trigger to issue an instruction to move the virtual viewpoint of the user to match the virtual viewpoint of the other user by walk-through in the apparatus 318 is detected in the operation information received from the operation acquisition unit 306. If the movement trigger is detected, the movement determination unit 307 outputs the operation information in which the movement flag is ON.

In step S430, the virtual viewpoint generation unit 310 calculates the virtual viewpoint position and orientation of the user based on the operation information received through the movement determination unit 307 and the actual viewpoint position and orientation information about the user received from the actual viewpoint acquisition unit 309. In this case, the virtual viewpoint generation unit 310 calculates the movement amount of the virtual viewpoint of the user based on the operation information received from the movement determination unit 307. Further, the virtual viewpoint generation unit 310 adds the calculated virtual viewpoint movement amount of the user to the actual viewpoint position and orientation of the user received from the actual viewpoint acquisition unit 309, thereby calculating the virtual viewpoint position and orientation in world coordinates. For example, if walk-through or the like is executed in the apparatus 301, the virtual viewpoint generation unit 310 calculates the movement amount of the virtual viewpoint along with the walk-through or the like of the user, and adds the calculated movement amount to the actual viewpoint position and orientation, thereby calculating the virtual viewpoint position and orientation moved by the walk-through or the like. Various existing methods may be used to calculate the virtual viewpoint movement amount based on the operation information, and descriptions thereof are omitted.

If the operation unit 305 and the actual viewpoint acquisition unit 309 are configured to acquire the position and orientation of body parts such as hands of the user, the position and orientation of the body parts are acquired and the viewpoint movement amount is also added to the position and orientation of the body parts. The position and orientation of the body parts such as hands of the user can be utilized for, for example, representation of the body parts in the avatar whose display position is moved based on the viewpoint movement.

In step S440, the transmission unit 315 transmits the actual viewpoint position and orientation and the virtual viewpoint position and orientation of the user to the apparatus 318, and the reception unit 314 receives the actual viewpoint position and orientation and the virtual viewpoint position and orientation of the other user that are acquired and calculated in the same manner as described above in the apparatus 318 and are transmitted from the apparatus 318. The actual viewpoint position and orientation and the virtual viewpoint position and orientation of the both users are thereby shared between the apparatus 301 and the apparatus 318.

If the apparatus 301 and the apparatus 318 have acquired the position and orientation of the body parts of the both users, the apparatus 301 and the apparatus 318 share the position and orientation information about the body parts of the both users by transmitting and receiving the position and orientation information.

In step S450, the relative relationship calculation unit 313 and the correction unit 312 check if the movement flag in the operation information is ON. If the movement flag is ON (YES in step S450), the processing proceeds to step S460. In contrast, if the movement flag is not ON (NO in step S450), the virtual viewpoint position and orientation information about the user generated by the virtual viewpoint generation unit 310 is sent from the relative relationship calculation unit 313 to the combining unit 311 through the correction unit 312. The processing of the information processing apparatus 319 then proceeds to step S480.

In step S460, the relative relationship calculation unit 313 calculates a relative position and orientation between the shared actual viewpoint position and orientation of the other user and the actual viewpoint position and orientation of the user. In the present exemplary embodiment, the relative relationship calculation unit 313 calculates the actual viewpoint relative position and orientation based on the actual viewpoint position and orientation information about the user received through the virtual viewpoint generation unit 310 and the actual viewpoint position and orientation information about the other user received by the reception unit 314.

If the position and orientation of the body parts are also shared between the apparatus 301 and the apparatus 318, the relative relationship calculation unit 313 also calculates the relative position and orientation between the body parts of the user and the body parts of the other user.

In step S470, the correction unit 312 performs processing for correcting a mismatch between the virtual viewpoint of the other user and the virtual viewpoint of the user. In the present exemplary embodiment, the correction unit 312 performs correction processing to move the virtual viewpoint position and orientation of the user to match the virtual viewpoint position and orientation of the other user by walk-through in the apparatus 318. In this case, the correction unit 312 performs correction processing to move the virtual viewpoint of the user to the coordinate system based on the virtual viewpoint of the other use. Specifically, the correction unit 312 performs correction processing to move the virtual viewpoint of the user to the origin of the coordinate system based on the virtual viewpoint of the other user. In other words, the correction unit 312 performs correction processing to move the virtual viewpoint of the user by adding the actual viewpoint relative position and orientation calculated by the relative relationship calculation unit 313 to the virtual viewpoint position and orientation of the other user. More specifically, the correction unit 312 adds the actual viewpoint relative position and orientation to the virtual viewpoint coordinate system with the origin corresponding to the virtual viewpoint position and orientation of the other user, thereby calculating the relative position and orientation corresponding to the virtual viewpoint of the user in the virtual viewpoint coordinate system of the other user. In this case, the virtual viewpoint position and orientation of the user are moved to the coordinate system with the origin corresponding to the virtual viewpoint of the other user in a state where the actual viewpoint relative position and orientation between the both users are maintained. Accordingly, as a motion in the world coordinate system, the actual viewpoint position and the virtual viewpoint position of the other user overlap, and the virtual viewpoint position and orientation based on the world coordinate system are moved by the movement amount.

In step S480, the combining unit 311 generates a 3D image based on the virtual viewpoint position and orientation of the user, and combines the generated 3D image with the actual environment captured image by superimposing the 3D image on the actual environment image, thereby generating a mixed reality image as a combination of the virtual image and the actual environment image. For example, if the movement flag is ON, the mixed reality image corresponds to the image that can be seen after correction processing is performed to match the virtual viewpoint position and orientation of the other user by walk-through. For example, if the movement flag is OFF and walk-through or the like is executed in the apparatus 301, the mixed reality image corresponds to the image that can be seen in the virtual viewpoint position and orientation of the user by walk-through or the like. In the present exemplary embodiment, the combining unit 311 also generates an avatar of the user based on the virtual viewpoint position and orientation, and combines the generated avatar with the actual environment image. Thus, the mixed reality image includes the avatar. An avatar of the other user may be generated using the shared information about the virtual viewpoint position and orientation of the other user. The avatar may represent, for example, only the head of the user, or may include the body parts, such as the torso and legs, located at positions estimated based on the head position.

Figure 5:
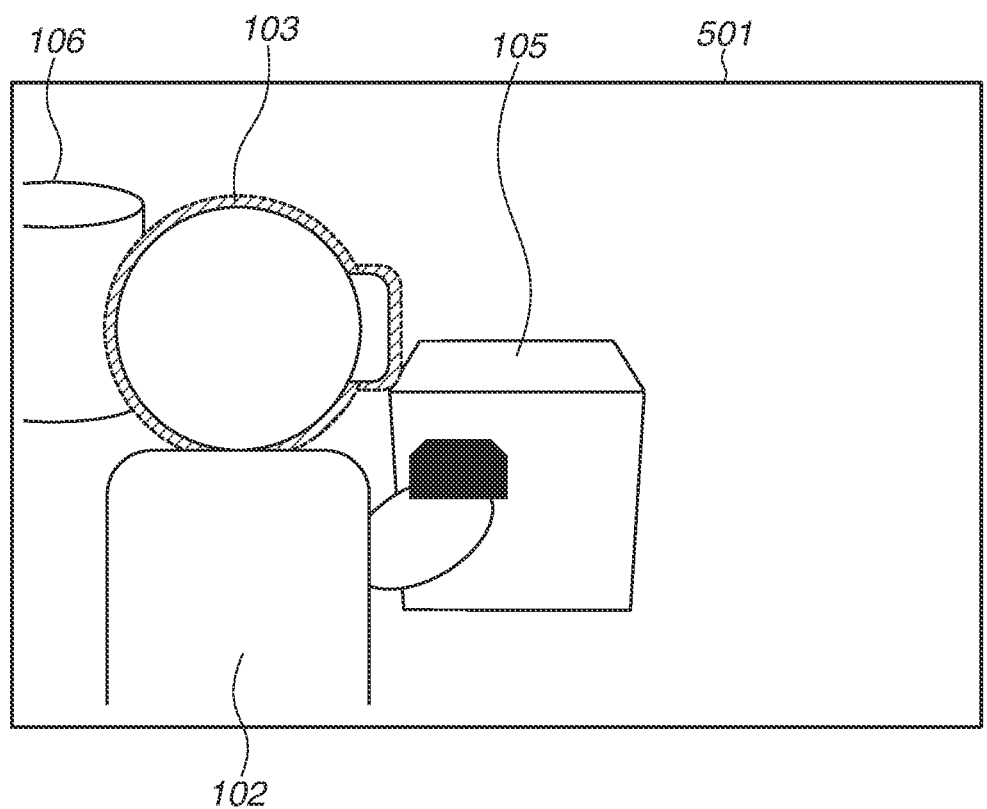
FIG. 5 illustrates a mixed reality image viewed from the virtual viewpoint of the user after correction.

FIG. 5 illustrates an example of the mixed reality space to be observed in the virtual viewpoint position and orientation of the user when the other user executes walk-through to execute the information processing according to the present exemplary embodiment illustrated in the flowchart of FIG. 4. FIG. 5 corresponds to the example illustrated in FIG. 2. The user corresponds to the user 101 and the other user corresponds to the user 102.

As described above, the correction unit 312 performs the processing for correcting the virtual viewpoint position and orientation calculated by adding the actual viewpoint relative position and orientation between the user 101 and the user 102 (other user) to the virtual viewpoint position and orientation of the user 102, to thereby obtain the corrected virtual viewpoint position and orientation of the user 101.

The virtual viewpoint position of the user 101 is thereby moved to the virtual viewpoint coordinate system of the user 102 in a state where the relative positional relationship between the actual viewpoint of the user 102 and the actual viewpoint of the user 101 is maintained. In the example illustrated in FIG. 2, the virtual viewpoint of the user 102 is moved to the position and orientation corresponding to the virtual viewpoint 104 by walk-through. As described above, the virtual viewpoint 104 of the user 102 is located at the intermediate position between the virtual model 105 and the virtual model 106 on the opposite side of the virtual model 105 and the virtual model 106. Accordingly, the view from the virtual viewpoint of the user 101 after the correction processing as illustrated in FIG. 3 described above is updated with the view illustrated in FIG. 5. Specifically, the view of each object located in the mixed reality space is changed such that the virtual model 105 that is seen on the left side from the user 101 in FIG. 2 is seen on the back side and substantially in front of the user 101 in FIG. 5. The actual viewpoint position of the user 102 overlaps the position of the virtual viewpoint 104, and the avatar 103 of the user 102 is seen at the entity position of the user 102. The virtual model 106 that is seen on the right back side in FIG. 3 is seen on the left side in FIG. 5.

In the case of providing the mixed reality to the user and a plurality of other users, the information processing apparatus 319 acquires the actual viewpoint position and orientation and the virtual viewpoint position and orientation of each of the other users from the information processing apparatus of each of the other users. The information processing apparatus 319 calculates the actual viewpoint relative position and orientation between the actual viewpoint position and orientation of each of the other users and the actual viewpoint position and orientation of the user, and corrects the virtual viewpoint position and orientation of the user based on, for example, the actual viewpoint relative position and orientation calculated for a selected desired other user. In the case of selecting the desired other user, the desired other user may be selected by the user through the operation unit 305, or may be automatically selected based on the positional relationship between the other user and the user in the actual space. For example, if the other user located near the user in the actual space executes walk-through, the mismatch in the relationship between the virtual viewpoint of the user and the virtual viewpoint of the other user by walk-through is likely to be conspicuous. Accordingly, it may be desirable to select, for example, the other user located within a predetermined distance from the user.

While the flowchart of FIG. 4 illustrates an example where the virtual viewpoint position of the user is moved while the actual viewpoint relative position and orientation between the user and the other user are maintained, the virtual viewpoint position of the user may be moved to the same position and orientation as the virtual viewpoint position of the other user. In this case, the way how the user can see the virtual space after the movement is the same as the way how the other user can see the virtual space after the movement.

The above-described exemplary embodiment illustrates an example where the virtual viewpoint position and orientation of the user is corrected to match the virtual viewpoint position and orientation of the other user based on the actual viewpoint relative position and orientation between the both users and the virtual viewpoint position and orientation of the other user. As a modified example, in the present exemplary embodiment, the virtual viewpoint position and orientation of the user may be arbitrarily moved by the user while the actual viewpoint relative position and orientation between the user and the other user are maintained in the mixed reality space. In this case, the view of each object located in the mixed reality space corresponds to the view from the virtual viewpoint position and orientation of the user. In this case, the position of the avatar displayed based on the virtual viewpoint position and orientation of the other user is updated along with the movement of the virtual viewpoint position and orientation of the user. In other words, when the virtual viewpoint position and orientation of the user are moved through the operation on the operation unit 305 such that the position of the avatar of the other user matches the entity position of the other user, the view seen by the user corresponds to the view illustrated in the example of FIG. 5.

As described above, the information processing apparatus 319 according to the present exemplary embodiment calculates the virtual viewpoint position of the user in the virtual viewpoint coordinate system with the origin corresponding to the virtual viewpoint of the other user during walkthrough, based on the virtual viewpoint position and orientation information and the actual viewpoint relative position and orientation information obtained by walk-through. Specifically, in the information processing apparatus 319 according to the present exemplary embodiment, correction processing is performed to move the virtual viewpoint position and orientation of the user based on the position and orientation of the other user by walk-through and the actual viewpoint position and orientation of the user, thereby reducing a positional deviation between the virtual viewpoints of the both users. Consequently, during walk-through in the MR or AR executed by a plurality of users, the mismatch in the relationship between the virtual viewpoint and the actual viewpoint of each user during walk-through can be eliminated, so that the users are less likely to be confused in communication.

In the first exemplary embodiment described above, after the movement flag is turned on upon detection of the operation input of the movement trigger and the virtual viewpoint position is corrected, the virtual viewpoint of each user is moved based on the operation information about each user in each apparatus until the next movement trigger is detected. A second exemplary embodiment illustrates an example where when the other user continuously moves the virtual viewpoint by walk-through, the virtual viewpoint position and orientation of the user are continuously corrected along with the movement of the virtual viewpoint position and orientation of the other user during the walkthrough.

Figure 6:
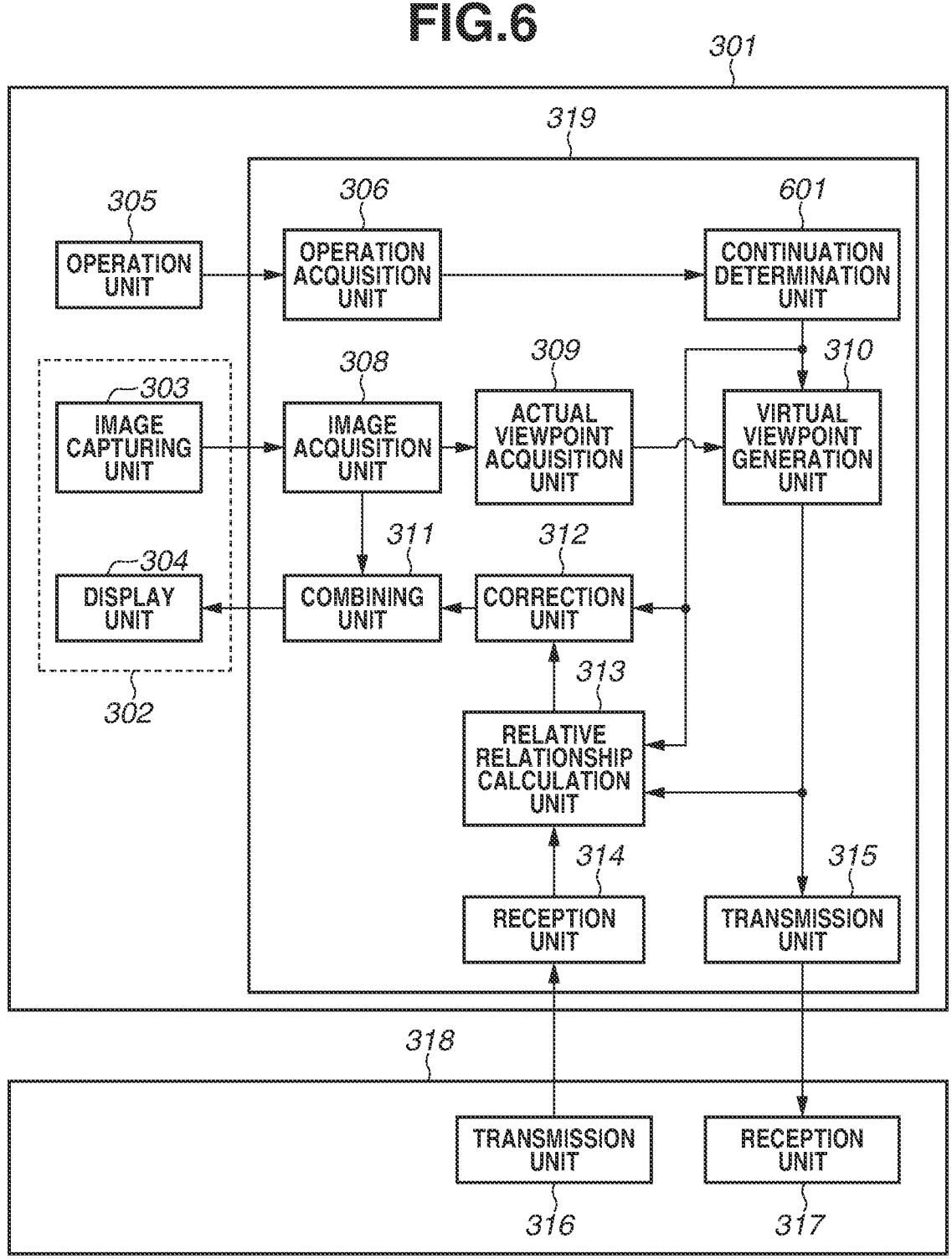
FIG. 6 is a block diagram illustrating a configuration example of an information processing apparatus according to a second exemplary embodiment.

FIG. 6 is a block diagram illustrating a configuration example of a system including an information processing apparatus 319 according to the second exemplary embodiment. In the configuration example illustrated in FIG. 6, the functional units similar to the functional units illustrated in FIG. 1 are denoted by the same reference numerals, and descriptions thereof are omitted. Configurations and processing that are different from those of the first exemplary embodiment will be described below.

The information processing apparatus 319 of the apparatus 301 illustrated in FIG. 6 includes a continuation determination unit 601. The continuation determination unit 601 includes not only the function similar to that of the movement determination unit 307 described above, but also a function for determining the presence or absence of predetermined movement continuation information indicating an input of a virtual viewpoint movement continuation operation in the operation information received from the operation acquisition unit 306. In other words, the continuation determination unit 601 functions as a continuation detection unit to detect the predetermined movement continuation information. Upon detecting the predetermined movement continuation information, the continuation determination unit 601 outputs, for example, the operation information in which a continuation flag is ON. If the continuation flag is ON, the relative relationship calculation unit 313 and the correction unit 312 continuously perform the above-described processing.

Figure 7:
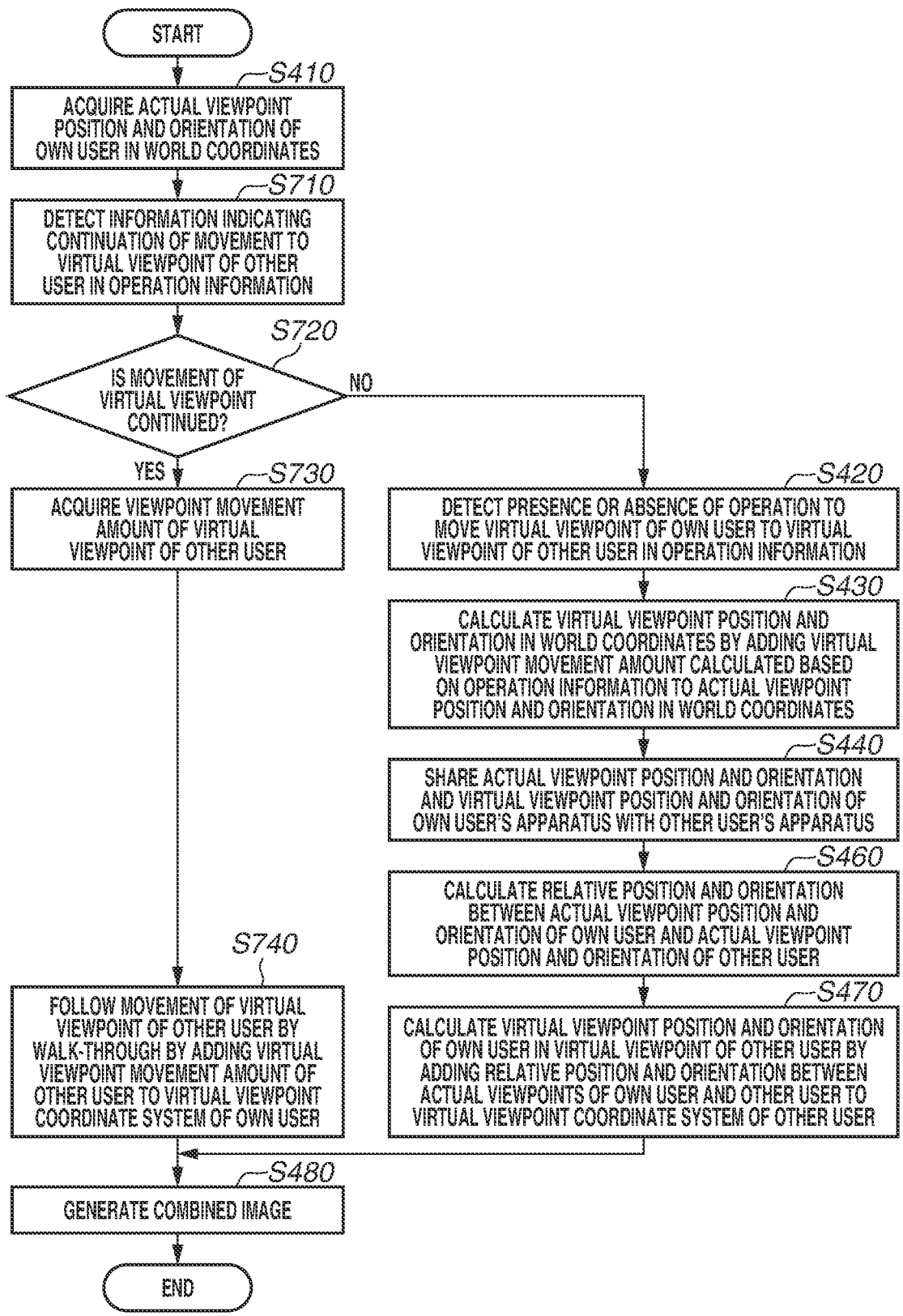
FIG. 7 is a flowchart illustrating an information processing flow according to the second exemplary embodiment.

FIG. 7 is a flowchart illustrating a processing flow of information processing performed in the information processing apparatus 319 of the apparatus 301 according to the second exemplary embodiment. Similarly to the example illustrated in the flowchart of FIG. 4, the processing in the flowchart of FIG. 7 is also performed in the information processing apparatus 319 of the apparatus 301 and the information processing apparatus of the apparatus 318. In the flowchart of FIG. 7, the same processing steps as those of FIG. 4 are denoted by the same step numbers as those in FIG. 4, and descriptions thereof are omitted.

In the flowchart of FIG. 7, the processing of the information processing apparatus 319 proceeds to step S710 after the processing of step S410. In step S710, the continuation determination unit 601 performs processing for detecting movement continuation information indicating that the movement to the virtual viewpoint of other user is continued based on the operation information received from the operation acquisition unit 306. In step S720, the continuation determination unit 601 determines whether to continue the movement of the virtual viewpoint based on the detection result on the operation information. If the continuation determination unit 601 determines that the movement of the virtual viewpoint is continued (YES in step S720), the processing proceeds to step S730. In contrast, if the continuation determination unit 601 determines that the movement of the virtual viewpoint is not continued (NO in step S720), the processing proceeds to step S420. The processing of step S420 and subsequent steps is similar to that in the flowchart of FIG. 4, and thus descriptions thereof are omitted. However, after the processing of step S440, the processing proceeds to step S460 in the second exemplary embodiment.

In step S730, the relative relationship calculation unit 313 continuously calculates the viewpoint movement amount of the virtual viewpoint of the other user based on the virtual viewpoint position and orientation information about the other user received by the reception unit 314, and sends the calculated viewpoint movement amount to the correction unit 312.

In step S740, the correction unit 312 continuously adds the viewpoint movement amount of the virtual viewpoint of the other user calculated in step S730 to the virtual viewpoint position and orientation of the user in world coordinates, thereby calculating the virtual viewpoint position and orientation of the user. Accordingly, the virtual viewpoint position of the user can be moved by following the movement of the virtual viewpoint of the other user by walkthrough. After the processing of step S740, the processing proceeds to step S480. In step S480, the mixed reality space image is generated in the same manner as described above.

In the first and second exemplary embodiments described above, the movement trigger to be input through the operation unit 305 is used to determine whether to move the virtual viewpoint of the user to match the virtual viewpoint of the other user. In contrast, a third exemplary embodiment illustrates an example where the viewpoint position and orientation of the user and the viewpoint position and orientation of the other user are used to determine whether to move the virtual viewpoint of the user to match the virtual viewpoint of the other user.

An information processing apparatus 319 according to the third exemplary embodiment calculates the magnitude of a relative position and orientation (referred to as a virtual viewpoint relative position and orientation) between the virtual viewpoint of the user and the virtual viewpoint of the other user. The information processing apparatus 319 according to the third exemplary embodiment acquires, as the movement trigger to move the virtual viewpoint of the user, information indicating that the magnitude of the virtual viewpoint relative position and orientation is greater than a predetermined threshold for relative position and orientation. Specifically, when the magnitude of the virtual viewpoint relative position and orientation between the user and the other user is greater than the predetermined threshold for relative position and orientation, the information processing apparatus 319 according to the third exemplary embodiment executes processing for correcting a mismatch between the virtual viewpoint of the other user by walk-through and the virtual viewpoint of the user. The present exemplary embodiment assumes a case where the virtual viewpoint of the other user has moved beyond an expected movement range by walk-through as a comparison condition in which the magnitude of the virtual viewpoint relative position and orientation is greater than the threshold for relative position and orientation. Specifically, the present exemplary embodiment assumes a case where when the virtual viewpoint of the other user has moved beyond the expected movement range by walk-through, the user automatically follows the movement of the virtual viewpoint of the other user.

The information processing apparatus 319 according to the third exemplary embodiment calculates a distance between the virtual viewpoint of the user and the virtual viewpoint of the other user as information indicating the magnitude of the relative position and orientation between the user and the other user, and uses a predetermined distance threshold as the threshold for relative position and orientation. When the information processing apparatus 319 acquires, as the movement trigger, information indicating that the calculated distance is greater than the predetermined distance threshold, similarly to the above-described exemplary embodiments, the processing of calculating the actual viewpoint relative position and orientation between the user and the other user is performed and the processing of correcting the virtual viewpoint position and orientation of the user is further performed.

Figure 8:
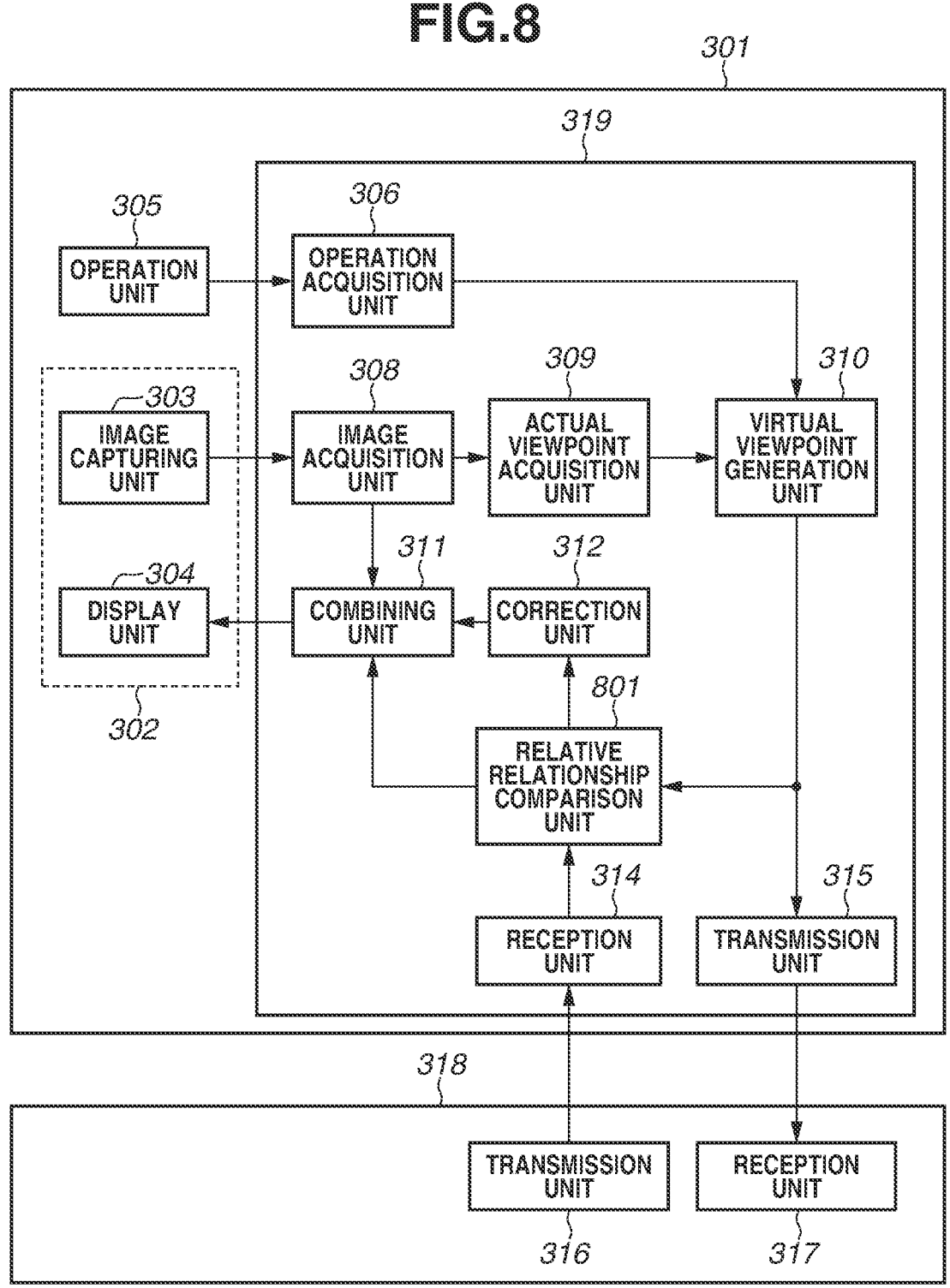
FIG. 8 is a block diagram illustrating a configuration example of an information processing apparatus according to a third exemplary embodiment.

FIG. 8 is a block diagram illustrating a configuration example of a system including the information processing apparatus 319 according to the third exemplary embodiment. In the configuration example illustrated in FIG. 8, the functional units similar to the functional units illustrated in FIG. 1 are denoted by the same reference numerals, and descriptions thereof are omitted. Only the configuration and processing that are different from those of the first exemplary embodiment will be described below.

The information processing apparatus 319 of the apparatus 301 illustrated in FIG. 8 does not include the movement determination unit 307 and the continuation determination unit 601 described above. The operation information acquired by the operation acquisition unit 306 is sent to the virtual viewpoint generation unit 310. In the same manner as described above, the virtual viewpoint generation unit 310 generates the virtual viewpoint position and orientation of the other user, and sends the virtual viewpoint position and orientation information about the user and the actual viewpoint position and orientation information received from the actual viewpoint acquisition unit 309 to the transmission unit 315. In the third exemplary embodiment, the virtual viewpoint position and orientation information and the actual viewpoint position and orientation information about the user output from the virtual viewpoint generation unit 310 are also sent to a relative relationship comparison unit 801. The relative relationship comparison unit 801 also receives the virtual viewpoint position and orientation information and the actual viewpoint position and orientation information about the other user that are transmitted from the transmission unit 316 of the apparatus 318 and are received by the reception unit 314.

The relative relationship comparison unit 801 includes not only the function of the relative relationship calculation unit 313 described above, but also a function for comparing a threshold with the magnitude of the relative position and orientation between the virtual viewpoint of the user and the virtual viewpoint of the other user. The relative relationship comparison unit 801 calculates the distance between the virtual viewpoints as the magnitude of the relative position and orientation between the virtual viewpoints of the both users, based on the virtual viewpoint position and orientation information about the user and the virtual viewpoint position and orientation information about the other user received by the reception unit 314. If the relative relationship comparison unit 801 determines that the calculated distance between the virtual viewpoints is greater than the distance threshold, the relative relationship comparison unit 801 acquires this determination result as the movement trigger. Upon detecting the movement trigger, the relative relationship comparison unit 801 thereafter performs actual viewpoint relative position and orientation calculation processing, i.e., processing for calculating the relative position and orientation between the actual viewpoint position and orientation of the user and the actual viewpoint position and orientation of the other user, similarly to the relative relationship calculation unit 313 according to the exemplary embodiments described above. If the calculated distance between the virtual viewpoints is smaller than or equal to the distance threshold, the relative relationship comparison unit 801 sends the virtual viewpoint position and orientation information about the user generated by the virtual viewpoint generation unit 310, to the combining unit 311.

Upon receiving the actual viewpoint relative position and orientation information from the relative relationship comparison unit 801, the correction unit 312 according to the third exemplary embodiment executes processing for correcting a mismatch between the virtual viewpoint of the other user by walk-through and the virtual viewpoint of the user, in the same manner as described above. Specifically, the correction unit 312 adds the actual viewpoint relative position and orientation between the user and the other user to the virtual viewpoint position and orientation of the other user, thereby correcting the virtual viewpoint position and orientation of the user to match the virtual viewpoint of the other user by walk-through or the like.

The combining unit 311 according to the third exemplary embodiment generates a 3D image based on the received virtual viewpoint position and orientation, and combines the generated 3D image with the actual environment captured image acquired by the image acquisition unit 308 by superimposing the 3D image on the actual environment image, thereby generating a mixed reality image as a combination of the virtual image and the actual environment image. In the third exemplary embodiment, after the correction unit 312 executes the correction processing, the mixed reality image generated by the combining unit 311 corresponds to the image that can be seen in the virtual viewpoint position and orientation of the other user by walk-through. In contrast, if the relative relationship comparison unit 801 determines that the distance is smaller than or equal to the distance threshold, the mixed reality image generated by the combining unit 311 corresponds to the image that can be seen in the virtual viewpoint position and orientation along with the walk-through or the like of the user.

Figure 9:
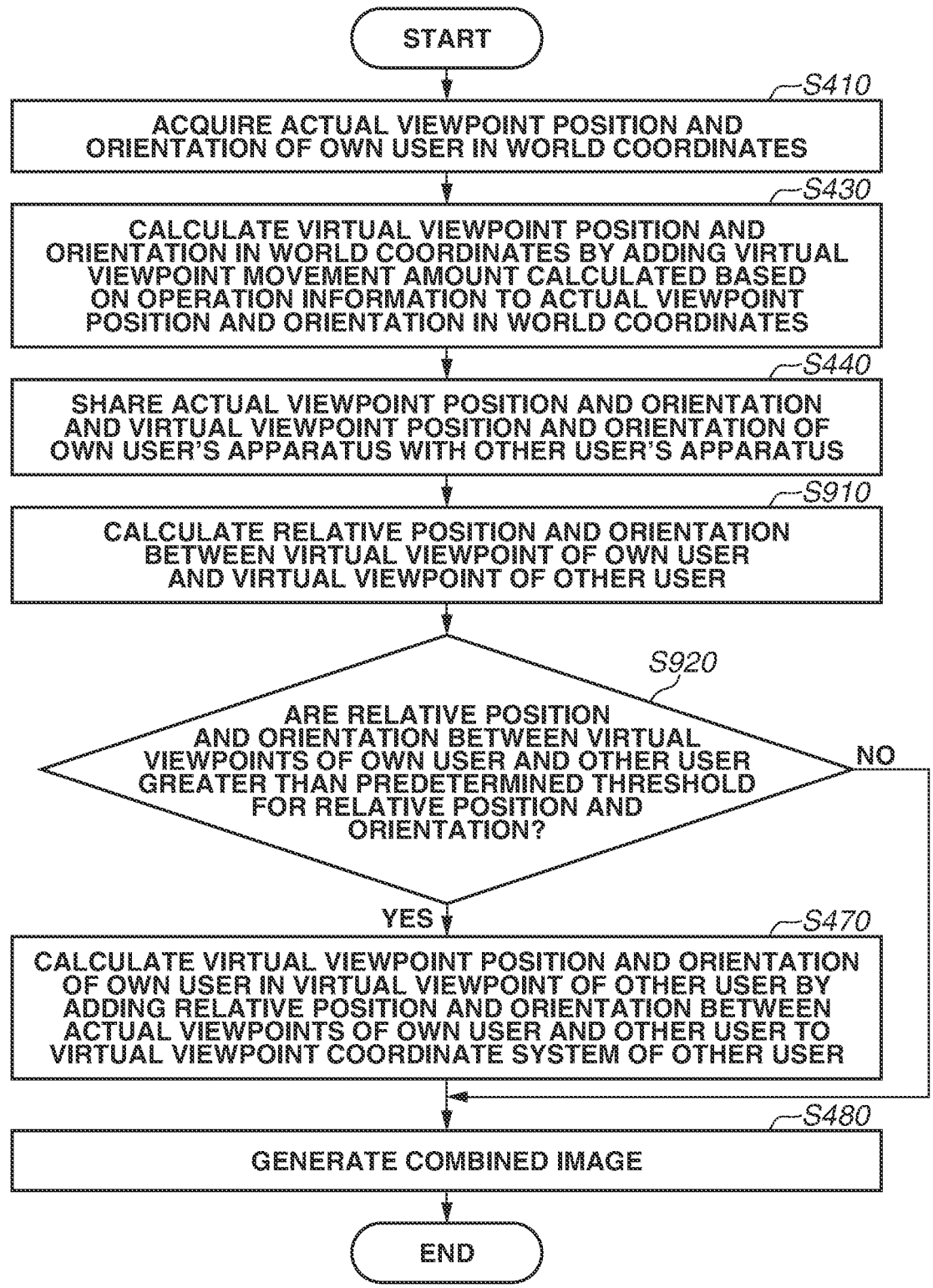
FIG. 9 is a flowchart illustrating an information processing flow according to the third exemplary embodiment.

FIG. 9 is a flowchart illustrating a processing flow of information processing performed in the information processing apparatus 319 of the apparatus 301 according to the third exemplary embodiment. Similarly to the example illustrated in the flowchart of FIG. 4, the processing in the flowchart of FIG. 9 is also performed in the information processing apparatus 319 of the apparatus 301 and the information processing apparatus of the apparatus 318. In the flowchart of FIG. 9, the same processing steps as those of FIG. 4 are denoted by the same step numbers as those in FIG. 4, and descriptions thereof are omitted.

In the flowchart of FIG. 9, after the processing of step S410, the processing proceeds to step S430, and after the processing of step S440, the processing proceeds to step S910. In step S910, the relative relationship comparison unit 801 calculates the relative position and orientation between the virtual viewpoint of the other user and the virtual viewpoint of the user.

In step S920, the relative relationship comparison unit 801 determines whether the magnitude of the virtual viewpoint relative position and orientation, which is the relative position and orientation between the virtual viewpoint of the user and the virtual viewpoint of the other user, is greater than the predetermined threshold for relative position and orientation that is set in advance. In the present exemplary embodiment, the relative relationship comparison unit 801 calculates the distance between the virtual viewpoint of the user and the virtual viewpoint of the other user, and determines whether the calculated distance is greater than the predetermined distance threshold. If it is determined that the magnitude of the virtual viewpoint relative position and orientation between the user and the other user is greater than the threshold for relative position and orientation (YES in step S920), the processing of the information processing apparatus 319 proceeds to step S470. If the magnitude of the virtual viewpoint relative position and orientation between the user and the other user is not greater than the threshold for relative position and orientation (NO in step S920), the processing proceeds to step S480. The processing of steps S470 and S480 is similar to that described above, and thus descriptions thereof are omitted.

In the determination processing of step S920, it is determined whether the magnitude of the virtual viewpoint relative position and orientation is greater than the threshold for relative position and orientation. However, the determination processing is not limited to this example. For example, as to the determination processing of step S920, it can be determined whether the magnitude of the virtual viewpoint relative position and orientation is smaller than or equal to the threshold for relative position and orientation, or whether the distance between the virtual viewpoint of the user and the virtual viewpoint of the other user is smaller than or equal to the predetermined distance threshold. In this case, when the distance between the virtual viewpoint of the other user that is moved by walk-through and the virtual viewpoint of the user is smaller than or equal to the distance threshold, or when the virtual point of the other user that is moved by walk-through and the virtual viewpoint of the user are located at a distance smaller than or equal to the distance threshold, the viewpoint of the user can be automatically moved to match the virtual viewpoint of the other user.

While the third exemplary embodiment illustrates an example where the presence or absence of the movement trigger is determined based on the distance between the virtual viewpoint of the user and the virtual viewpoint of the other user, the presence or absence of the movement trigger may be determined based on a distance between the actual viewpoint of the user and the actual viewpoint of the other user. In this case, the relative relationship comparison unit 801 calculates the distance between the actual viewpoint of the user and the actual viewpoint of the other user based on the actual viewpoint position and orientation information about the user and the actual viewpoint position and orientation information about the other user. The relative relationship comparison unit 801 then acquires, as the movement trigger, information indicating that it is determined that the distance is greater than the distance threshold. Upon detecting the movement trigger, the relative relationship comparison unit 801 performs processing for calculating the actual viewpoint relative position and orientation between the user and the other user.

According to the third exemplary embodiment, a positional deviation between the virtual viewpoint of the user and the virtual viewpoint of the other user can be automatically reduced without using the trigger operation input used in the first or second exemplary embodiment. Consequently, also in the third exemplary embodiment, during walk-through in the MR or AR executed by a plurality of users, the mismatch in the relationship between the virtual viewpoint and the actual viewpoint of each user during walk-through can be eliminated, so that the users are less likely to be confused in communication.

The information processing apparatus 319 according to the third exemplary embodiment may include the movement determination unit 307 described in the first exemplary embodiment and the continuation determination unit 601 described in the second exemplary embodiment.

In addition, the information processing apparatus 319 is prepared for each user in the first to third exemplary embodiments described above. Alternatively, a single information processing apparatus 319 can be used to perform the above-described information processing by communicating with the operation unit 305 and the terminal 302 of each user.

Figure 10:
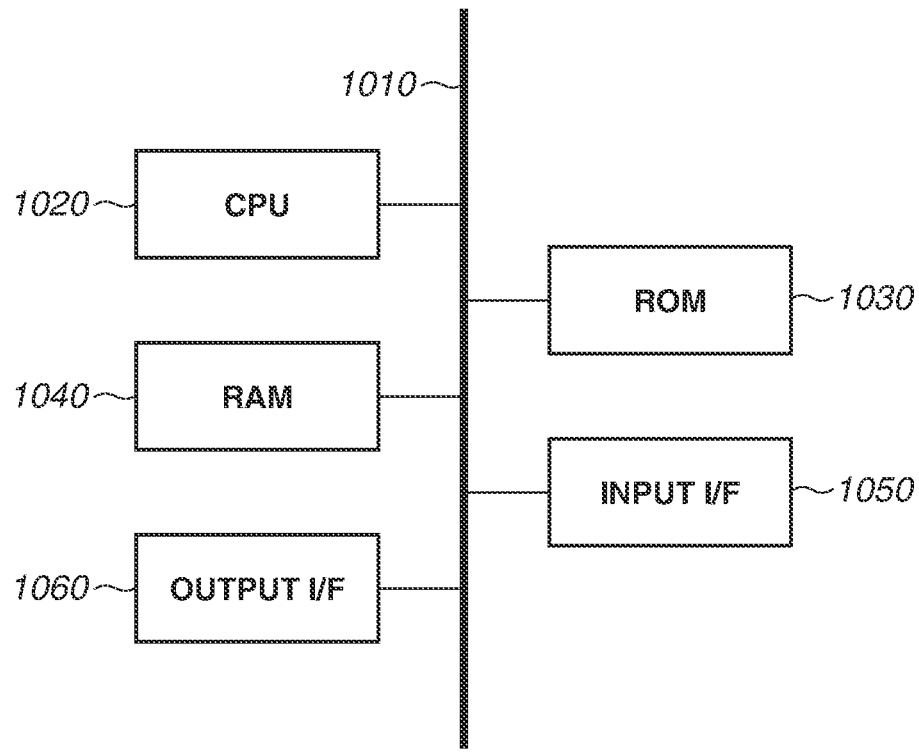
FIG. 10 illustrates a hardware configuration example of the information processing apparatus.

FIG. 10 illustrates an example of a hardware configuration in which the information processing apparatuses 319 according to each exemplary embodiment described above can be implemented.

As illustrated in FIG. 10, a central processing unit (CPU) 1020 comprehensively controls devices connected via a bus 1010. The CPU 1020 reads out and executes processing steps and programs stored in a read-only memory (ROM) 1030. An operating system (OS), information processing programs according to the exemplary embodiments, device drivers, and the like are stored in the ROM 1030, and are temporarily stored in a random access memory (RAM) 1040 and are executed, as needed, by the CPU 1020. An input interface (I/F) 1050 is used for the information processing apparatus 319 according to the exemplary embodiments to input signals from external apparatuses (e.g., the image capturing unit 303 of the terminal 302, the operation unit 305, and the apparatus 318) in any format that can be processed by the information processing apparatus 319 according to the exemplary embodiments. An output OF 1060 is used for external apparatuses (e.g., the display unit 304 of the terminal 302, and the apparatus 318) to output signals in any format that can be processed by the external apparatuses. These functional units are implemented by the CPU 1020 loading programs stored in the ROM 1030 into the RAM 1040 and executing the programs in accordance with the flowcharts according to the exemplary embodiments described above. For example, if hardware is configured as an alternative for software processing using the CPU 1020, an arithmetic unit or a circuit corresponding to the processing of each functional unit described herein may be configured.

Each of the functional units in the information processing apparatus 319 according to the exemplary embodiments described above may be implemented by hardware, or some of the functional units may be executed by software. If the functional units are executed by software, the software is executed using, for example, the CPU 1020, the ROM 1030, and the RAM 1040 illustrated in FIG. 10.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-015693, filed Feb. 3, 2022, which is hereby incorporated by reference herein in its entirety.

What is claimed is:

1. An information processing apparatus comprising:
a memory; and
at least one processor in communication with the at least one processor, the memory storing instructions that, when executed by the at least one processor, cause the at least one processor to:
acquire an actual viewpoint position and orientation of a first user and a virtual viewpoint position and orientation of the first user;
acquire an actual viewpoint position and orientation of each of a plurality of second users and a virtual viewpoint position and orientation of each of the plurality of second users;
calculate, for each of the plurality of second users, a relative position and orientation between the actual viewpoint position and orientation of the first user and the actual viewpoint position and orientation of the second user; and
correct the virtual viewpoint position and orientation of the first user based on the virtual viewpoint position and orientation of the second user selected from among the plurality of second users and a corresponding relative position and orientation between the actual viewpoint position and orientation of the first user and the selected second user.

2. The information processing apparatus according to claim 1, wherein the virtual viewpoint position and orientation of the first user is generated based on operation information about a viewpoint position input from the first user and the actual viewpoint position and orientation of the first user.

3. The information processing apparatus according to claim 1,
wherein the memory storing instructions that, when executed by the at least one processor, cause the processor to transmit the actual viewpoint position and orientation of the first user and the virtual viewpoint position and orientation of the first user to an information processing apparatus of a second user included in the plurality of second users,
wherein the memory storing instructions that, when executed by the at least one processor, cause the processor to receive the actual viewpoint position and orientation of the selected second user and the virtual viewpoint position and orientation of the selected second user transmitted from the information processing apparatus of the second user, and
wherein the actual viewpoint position and orientation of the first user and the virtual viewpoint position and orientation of the first user, and the actual viewpoint position and orientation and the virtual viewpoint position and orientation of the selected second user are shared between an information processing apparatus of the first user and the information processing apparatus of the second user.

4. The information processing apparatus according to claim 1, wherein a virtual viewpoint of the first user is moved to a coordinate system representing the virtual viewpoint position and orientation of the selected second user.

5. The information processing apparatus according to claim 4, wherein the virtual viewpoint of the first user is moved to an origin of the coordinate system representing the virtual viewpoint position and orientation of the selected second user.

6. The information processing apparatus according to claim 5, wherein the virtual viewpoint of the first user is moved by adding the relative position and orientation to the virtual viewpoint position and orientation of the selected second user.

7. The information processing apparatus according to claim 6, wherein a relative position and orientation is calculated corresponding to the virtual viewpoint of the first user in a virtual viewpoint coordinate system of the second user by adding the relative position and orientation to a virtual viewpoint coordinate system with an origin corresponding to the virtual viewpoint position and orientation of the selected second user.

8. The information processing apparatus according to claim 1, wherein upon detection of a predetermined trigger, the relative position and orientation is calculated, and the virtual viewpoint position and orientation of the first user is corrected.

9. The information processing apparatus according to claim 1, wherein upon detection of predetermined continuation information, the relative position and orientation is calculated, and the virtual viewpoint position and orientation of the first user is corrected.

10. The information processing apparatus according to claim 9,
wherein a viewpoint movement amount of a virtual viewpoint of the second user is continuously based on the virtual viewpoint position and orientation of the second user, and
wherein the virtual viewpoint position and orientation of the first user is corrected by adding the viewpoint movement amount that has been continuously calculated to the virtual viewpoint position and orientation of the first user.

11. The information processing apparatus according to claim 1, wherein upon detection of a predetermined trigger based on a relative position and orientation between the virtual viewpoint position and orientation of the first user and the virtual viewpoint position and orientation of the selected second user, the relative position and orientation between the actual viewpoint position and orientation of the first user and the actual viewpoint position and orientation of the selected second user is calculated.

12. The information processing apparatus according to claim 11, wherein the predetermined trigger is detected based on a comparison between a predetermined threshold and a magnitude of the relative position and orientation between the virtual viewpoint position and orientation of the first user and the virtual viewpoint position and orientation of the selected second user.

13. The information processing apparatus according to claim 12, wherein the predetermined trigger is detected, in a case where the magnitude of the relative position and orientation between the virtual viewpoint position and orientation of the first user and the virtual viewpoint position and orientation of the selected second user is greater than the predetermined threshold.

14. The information processing apparatus according to claim 12, wherein the predetermined trigger is detected, in a case where the magnitude of the relative position and orientation between the virtual viewpoint position and orientation of the first user and the virtual viewpoint position and orientation of the selected second user is smaller than or equal to the predetermined threshold.

15. The information processing apparatus according to claim 1, wherein upon detection of a predetermined trigger based on a comparison between a predetermined distance threshold and a distance between an actual viewpoint position of the first user and an actual viewpoint position of the second user, the relative position and orientation between the actual viewpoint position and orientation of the first user and the actual viewpoint position and orientation of the selected second user is calculated.

16. The information processing apparatus according to claim 15, wherein the predetermined trigger, in a case where the distance between the actual viewpoint position of the first user and the actual viewpoint position of the selected second user is greater than the predetermined distance threshold.

17. An information processing method comprising:
acquiring, as a first acquisition, an actual viewpoint position and orientation of a first user and a virtual viewpoint position and orientation of the first user;
acquiring, as a second acquisition, an actual viewpoint position and orientation of each of a plurality of second users and a virtual viewpoint position and orientation of a each of the plurality of second users;
calculating, for each of the plurality of second users, a relative position and orientation between the actual viewpoint position and orientation of the first user and the actual viewpoint position and orientation of the second user; and
correcting the virtual viewpoint position and orientation of the first user based on the virtual viewpoint position and orientation of a second user selected from among the plurality of second users and a corresponding relative position and orientation between the actual viewpoint position and orientation of the first user and the actual viewpoint position and orientation of the selected second user.

18. A non-transitory computer-readable storage medium storing a program that causes a computer to execute an information processing method, the information processing method comprising:
acquiring, as a first acquisition, an actual viewpoint position and orientation of a first user and a virtual viewpoint position and orientation of the first user;
acquiring, as a second acquisition, an actual viewpoint position and orientation of each of a plurality of second users and a virtual viewpoint position and orientation of a each of the plurality of second users;
calculating, for each of the plurality of second users, a relative position and orientation between the actual viewpoint position and orientation of the first user and the actual viewpoint position and orientation of the second user; and
correcting the virtual viewpoint position and orientation of the first user based on the virtual viewpoint position and orientation of a second user selected from among the plurality of second users and a corresponding relative position and orientation between the actual viewpoint position and orientation of the first user and the selected second user.

* * * * *